(12) United States Patent
Summe et al.

(10) Patent No.: US 7,386,102 B2
(45) Date of Patent: Jun. 10, 2008

(54) SYSTEM FOR REMOTE CONTROL OF AN AUTOMATED CALL SYSTEM

(76) Inventors: Louis Edward Summe, 317 W. 99th St., Apt. 8B, New York, NY (US) 10025; Robert Karl Johannes Killheffer, 9 School St., Woodbury, CT (US) 06798

( * ) Notice: Subject to any disclaimer, the term of this patent is extended or adjusted under 35 U.S.C. 154(b) by 0 days.

(21) Appl. No.: 11/029,824

(22) Filed: Jan. 5, 2005

(65) Prior Publication Data
US 2005/0175168 A1  Aug. 11, 2005

Related U.S. Application Data

(60) Provisional application No. 60/534,063, filed on Jan. 5, 2004.

(51) Int. Cl.
 *H04M 1/64* (2006.01)
(52) U.S. Cl. .................. 379/69; 379/265.02; 370/352; 709/224
(58) Field of Classification Search ........... 379/265.02, 379/265.06, 266.02, 67.1, 265.09, 69; 370/328, 370/352; 709/224
See application file for complete search history.

(56) References Cited

U.S. PATENT DOCUMENTS

| 6,711,254 | B2 * | 3/2004 | Sato et al. ............. 379/265.02 |
| 6,763,104 | B1 * | 7/2004 | Judkins et al. ......... 379/265.09 |
| 6,772,188 | B1 * | 8/2004 | Cloutier ..................... 709/224 |
| 6,973,057 | B1 * | 12/2005 | Forslow ..................... 370/328 |
| 7,085,257 | B1 * | 8/2006 | Karves et al. ............. 370/352 |
| 2005/0190908 | A1 * | 9/2005 | Haug et al. ........... 379/265.06 |

* cited by examiner

*Primary Examiner*—Gerald Gauthier
(74) *Attorney, Agent, or Firm*—Wood, Herron & Evans, LLP (57) ABSTRACT

A system for automatically generating and controlling a plurality of outgoing telephone calls from a first physical location, includes displaying, in a second physical location that is physically remote from the first location, data regarding telephone calls handled by an automated outbound call system. A second location, a manually input specification regarding the telephone calls handled by the outbound call system, is accepted. The operation of the outbound call system is then varied at the first location based upon the input specification accepted at the second location to control the outgoing telephone calls.

16 Claims, 5 Drawing Sheets

Custom Results Report

Select the starting and ending dates for the desired results report and click "Generate Report" to view.

Start Date     10/01/03 ~102

End Date     10/13/03 ~103

(Generate Report)
104

Note: Available results include the current month and the previous month.

DEMO CLIENT CALL RESULTS DETAIL

10/21/03 results as of 10:35:01 ET ~202

(results updated every 10 minutes) ~203

| | |
|---|---|
| Connected Calls | 5501 ~204 |
| No Connection | 1323 ~205 |

206

| Results Breakdown | 207 | 208 | |
|---|---|---|---|
| Payment by Credit Card | 35 | 0.51% | ~209 |
| Total Amount Paid  $1489.60 | | | ~210 |
| Payment via Check by Phone | 6 | 0.09% | ~209 |
| Total Amount Paid  $195.38 | | | ~210 |
| Payment Promised | 171 | 2.51% | ~209 |
| Patient Says Mailed or Will Mail Payment | 138 | 2.02% | ~210 |
| Patient Will Pay Via Web Site | 33 | 0.48% | ~210 |
| Operator Transfers | 414 | 6.07% | ~209 |
| Total Minutes with Operator  1,118 mins 29 secs | | | ~210 |
| Left Message | 3457 | 51.98% | ~209 |
| Machine, Left Message | 2987 | 43.77% | ~210 |
| Listened | 248 | 3.63% | ~210 |
| Patient Not Home | 312 | 4.57% | ~210 |
| Hang Ups | 1328 | 19.46% | ~209 |
| Hung Up in Opening | 1328 | 19.46% | ~210 |
| No Connection | 1247 | 18.27% | ~209 |
| No Answer/Busy | 1170 | 17.15% | ~210 |
| Invalid Phone Number | 77 | 1.13% | ~210 |
| Not Attempted | 76 | 1.11% | ~209 |
| Invalid Phone Number (Not Made) | 16 | 0.23% | ~210 |
| Duplicate Call (Not Made) | 60 | 0.88% | ~210 |

SYSTEM FOR REMOTE CONTROL OF AN AUTOMATED CALL SYSTEM

The application claims the benefit of the priority of U.S. Provisional Application Ser. No. 60/534,063, filed Jan. 5, 2004, which application is incorporated herein by reference.

FIELD OF THE INVENTION

The present invention relates to automated telephone call systems in general, and in particular to remote control of an automated telephone call system, which generates a plurality of outgoing calls.

BACKGROUND OF THE INVENTION

Companies that need to contact their clients, debtors, and other parties that they have relationships with, often spend significant amounts of money employing large numbers of human operators to make telephone call to the parties of interest. For example, in the case of debt collection, a company may deploy large groups of human telephone operators at one or more call centers to place telephone calls to the various debtors. The cost of completing such phone calls is, in many cases, a significant percentage of a call center's operating budget. As may be appreciated, the primary expense of generating the multiple telephone calls is the labor component.

In the specific case of debt collection, the expenses for operating a call center or generating the multiple calls are offset by the call center's effectiveness in collecting on the outstanding debts and reducing the number of accounts that become so-called "bad debt". While completing calls with human operators is expensive, contacting consumers in a timely manner is often important in avoiding an accounting write-off or "bad debt", which results in reduced earnings for the company.

To reduce the expense of the operators and other labor that is required to generate and complete a phone call, many call centers now deploy software and hardware systems that are designed to improve operator productivity. The systems are commonly referred to as automated call systems. Such automated call systems make and control ("generate") outgoing calls based on data stored in a database, file system, or other computer-readable medium, storing information regarding the clients, debtors, or other party to be contacted. The systems typically use pre-recorded and/or synthesized speech, call logic, DTMF (dual tone multiple frequency, or touch-tone) and/or voice input by the called party (interactive voice response or "IVR"), to automate the interaction with the called party. This frees up operators from part of the task associated with generating and completing a call. The automatic part of the call collects data from the called party, in the form of isolated responses, events and/or call history. This information is used to further guide the call, such as to direct it to a human operator, and to improve the overall efficiency of the operators and other call center employees.

In the case of debt collection, for example, one goal is to automatically collect information relating to various aspects of the called parties, such as: (1) their identity, (2) their intent to work with the creditor to resolve the debt, (3) why their account is overdue, (4) the resolution of their debt, and (5) any other information necessary for the collections process.

During an automated outbound call system's operation, multiple simultaneous calls are initiated, to standard voice telephone lines. When the calls are answered by the called party, the system asks the called party a series of questions relating to receivables that are owed to the collector for services rendered to them, by playing pre-recorded or synthesized speech over the phone lines. Depending on how the patient responds to questions the calls branch to additional questions providing and capturing information. For example if the patient has confirmed their identity, indicated that they have insurance and indicated that they would like to fax a copy of their insurance card to the provider, then the call will provide the appropriate fax number to the patient. The called party's DTMF responses (or spoken responses recognized using speech recognition technology, and codified as symbols) are passed back to the call generation system. The system then makes a decision of continued interaction based on the responses, combined with so-called call logic, which dictates the course of action for all possible states of the call.

While currently offered automated outbound call systems can deliver various benefits, such as increasing the efficiency of using human operators and thus reducing the overall labor costs per volume of calls generated and completed, they have some significant limitations. First, there is substantial time and expense associated with the purchase, implementation and maintenance of automated outbound call center productivity systems at the customer's premises. For example, if transfer rate of outgoing calls to a human operator at a call center is 5% (a common rate), then hardware, software, and lines to handle 20 outgoing calls are necessary for each employed operator at the call center. This makes deploying automated solutions for outbound call generation terribly expensive and inefficient. Furthermore, it is difficult to determine if and when the benefits exceed the expenses, because much of the cost is incurred prior to operation of the system and the savings generally occur in later periods. Accurately predicting the future savings of these systems can also be difficult. The task of calculating the system's future return on investment is often made even more difficult by an inability for a business to predict its capacity, geography, regulatory and feature requirements. Unanticipated requirements are especially challenging when the modification and upgrade of the system at the customer's or user's premises requires a substantial delay. Many call centers have a different set of requirements by the time the system is operational. These specification changes have eliminated the economic benefit of many call center productivity projects and can make it a poor place to make capital system investments.

Some current automated, outbound call center systems have tried to address the expenses associated with the purchasers and maintenance of these systems by utilizing Internet technologies to provide a more convenient interface. These systems come in a wide variety of configurations. However, all of the systems contain substantial automated outbound system components that are in the same physical location as the operators. Others have designed individual automated systems that operate remote from the client's telephone agents or call center. However, all of the current automated, outbound systems are based on the assumption that the hardware and software needed for their operation be located at the user's call center site, and that the software be closely integrated with the user's back-end system, thus increasing the time it takes to integrate and maintain the system's services. These systems also generally require that the user's site be specifically staffed for running the system on site, thus increasing the labor and time costs for ensuring the proper desired operation. Therefore, there is still a need in the prior art to increase the cost effectiveness and productivity of a call center. At the same time it is desirable to reduce the overall capital costs of simply installing an expensive automated call system at the user's premises. Until now, existing systems have not addressed these needs and other needs in the industry.

BRIEF DESCRIPTION OF DRAWINGS

The accompanying drawings, which are incorporated in and constitute a part of this specification, illustrate embodiments of the invention and, together with the detailed description of the embodiments given below, serve to explain the principles of the invention.

DETAILED DESCRIPTION OF EMBODIMENTS OF THE INVENTION

The present invention addresses these and other needs in the prior art by providing an automated, outbound call system that may be utilized and controlled without the substantial time and expense that is normally required for purchasing, implementing and maintaining prior art systems at a user's premises. By enabling the call generating system to be remote from the call center premises, the inventive system can be located at a backbone point of presence (POP) where it can access long distance optical fiber using an Internet protocol (private Internet network). From this backbone POP, substantial economies of scale are brought to bear on the purchase, implementation and maintenance of automated outbound calling systems. For example, a POP presence enables a Gigabyte ethernet connection, which enables at least ten thousand (10 k) simultaneous calls per line using the Internet protocol. This offers a potential 10,000:1 benefit when compared to the prior art. The present invention greatly helps call centers gain a return on their system investments and allows for increased call center productivity. The benefits are compounded because the system is flexible enough to offer capacity increases or decreases without additional expense or time delay. Limited initial expenses combined with on-demand capacity and features allow a call center operator to match the systems' expenses, with a decrease in operator expenses. Matching these expenses substantially reduces the difficulty of call centers realizing productivity gains and financial returns on their technology investments.

More specifically, the present invention provides cost-efficiency in the deployment of systems that automate outgoing telephone calls, for purposes of debt and overdue accounts collection as well as other purposes. The system provides a cost-efficient alternative to on-site deployment of an automated outgoing telephone call generation system and utilizes partial or fully remote integration at a first site with the technology of the user's own existing inbound call processing systems, back-end technology, and data at another site physically remote from the first site. The system further provides manual control of call generation at a second site using manually or automatically provided real-time data (a) about the number of available human operators, and (b) about the desired maximum number of simultaneous outgoing telephone calls provided by the user at the second site remote from the first site. The invention also provides for on-demand display of real-time data, future (predicted) data, and historical data at the second site to support the manual or automatic control of call generation and processing at the other, or first, site. In further features, the system enables human operators to work as part of the call automation, whereby the call automation system transfers a call to these human operators at the call center location (which may be at a separate third site) in ways that provide information to the human operator about, and related to, the called party, and to the called party about, and related to, the human operator or the user.

In the present invention, a telephony platform (the "system") is provided, capable of automatically generating and controlling outgoing telephone calls and interactions with called parties. The system does not have to be purchased or owned by the user and thus eliminates a significant cost associated with traditional automated call centers. The user of the system ("user") is generally a party who needs to contact many individuals ("called parties") via telephone, over longer or shorter periods of time. For example, the called parties may be debtors; i.e., patients who have not paid their medical bills. The system's deployment may substantially improve a collector's ability to collect overdue accounts. The human operator, to which calls are sometimes eventually routed, generally works on behalf of the system's user, to handle interaction that cannot or should not be automated and needs human intelligence.

In the discussed embodiment, the system is targeted to overdue account and debt collection, and any and all information related thereto, such as electronic payment information and approval, such as credit card, debit card, or electronic check information, and other data. However, the invention has very general application in the domain of outgoing call generation systems, and thus has broader applicability than debt collection. The system is also described herein as being at a first site and fully remote from the user at a second location. However, it has great flexibility in the way it is deployed, as its components are highly modular and can be configured in many ways to support any particular user's needs. The first site call center interfaces via the Internet with the user at a second site, operators at a potential third site and a database at a potential fourth site.

The system has features that make it uniquely capable of increasing the collector's effectiveness in collecting accounts including: (a) partial or full remote integration, meaning that the system can be deployed physically independently from the user's location in part or in whole, (b) a method for dynamically controlling outgoing telephone calls through specifying the number of available human operators and the maximum number of outgoing phone calls, (c) a method for displaying up-to-date call data, status and information to a user location that is remote from the call system, (d) a method for displaying historical data related to the calls generated by the system, and their effects such as abandoned calls, transferred calls, etc., (e) a method for displaying predicted data about calls, based on various data including previous inbound calling patterns and historic live operator transfer rates, and current inbound call load, time of day, day of week, day of month, etc.

To set up the call generation system, a user, at a second location remote from the first location of the automated call generation system, is given an account on the system; the user can then log onto the system and do necessary operations to start its operation, as described below.

Figure 1:
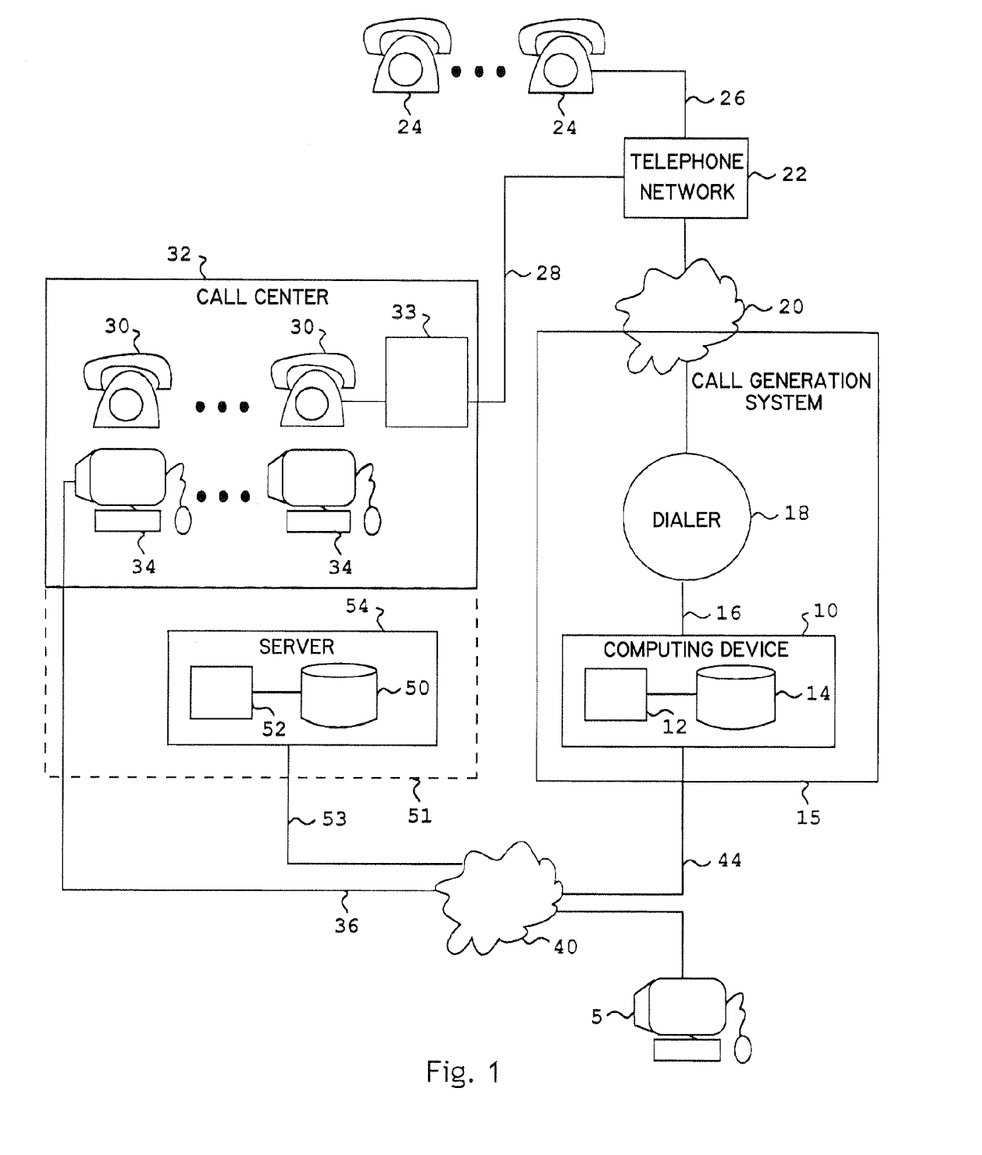
FIG. 1 is a schematic diagram of an embodiment of the invention.

Referring to FIG. 1, remote integration allows the user 5 of the inventive system to be located elsewhere (second location), in part or in full, from the physical location of the call generation system 15 (first location). As used herein, the term "location" generally refers to physical locations, and specifically refers to physically remote locations that are separated by a significant distance. For example, locations in the same building or room, which might be coupled simply through a cable, are generally not the kinds of locations referred to. Of course, the invention would not be limited by distance, but rather would be most cost-effective and applicable when used between locations that are physically separated a significant distance. The hardware and software generating outgoing telephone calls, as well as the data needed to generate the call and control the interaction, can all live remotely from the user and remotely from the user's live operator call center 32. A computing device 10 (which may be a PC, a server, or other appropriate processing device) runs a call generation program 12 and has access to a database 14 (which may be in the memory of the device 10). The call generator program interfaces with a dialing application or dialer 18 via an appropriate link 16. The components 12, 14 and 18 are generally referred to a telephony system or automated call system 15 and comprise the main components (although not all) of the remote system. To illustrate the invention, the system 15 is indicated as being located at the first location on site, which is generally used to designate the physical location of the system. The user of the system, in accordance with the invention, is located at another remote location, (second location or site), and is able to control and access the system 15 at the first location. Specifically, a user 5 is shown with a computer terminal in FIG. 1, and is connected with the Internet 40 (such as a public Internet) via link 42, which may be a suitable network link. System 15 is also coupled to Internet 40 via a suitable network link 44.

The user 5 controls system 15 remotely and the system itself is also remote from the physical presence of the call center 32, operator 34, or user 5. The device 10 is connected via link 16 to dialing application 18, as noted above. Device 10 and dialing application 18 are connected to a private network Internet 20 (e.g., Level 3), which in turn is connected to the publicly switched telephone network 22. That is, system 15 is located at a backbone POP with the Internet 20 where the system can use an Internet protocol to access optical fiber. As noted above, this translates to a potential 10,000:1 efficiency over prior art automated outbound call systems. Various parties to be called 24 are also connected to the telephone network 22 via link 26. The telephone network 22 is also connected via link 28 to one or more human operators 30 located at another location 32, such as a third location, that can be physically remote from the location of both the system 15 and the location of the user 5 in accordance with the principles of the present invention. The human operators 30 further are equipped with computers or computer terminals 34 that are connected via a network link 36 to the Internet 40, to which the call generation system 15 is also connected. A database 50 containing information regarding the parties to be called 24 is connected to a central processing unit 52 contained in a server 54 or other appropriate device. The server 54 may be located either at the same place 32 as the human operators or remotely at another location as indicated by reference numeral 51. The server 52 and/or database 50 is accessible from the human operators' terminals, either residing on their local computer, or accessible via a local-area network, a wide-area network or the Internet. In this drawing it is shown being available via the Internet 40 through an appropriate network link 53.

To start, the system requires access to the user's (e.g. credit card or mortgage accounts) receivables data, typically stored in a database (e.g. an A/R—Accounts receivable—database, such as database 50), as well as the call logic to use the data. This database typically contains (a) the phone numbers of the parties to be called, (b) the phone number of the call center where the human operators are located, for transferring calls to, (c) data relating to the called parties, such as their amount due, their name, account ID, etc. In the case of debt collection, the database typically shows the amount each party to be called owes and for how long ("receivables age"). In the system illustrated in FIG. 1, for example, the remote system 5 accesses the database 50 via Internet 40 and extracts the necessary information. The system uses the information in the database to make outgoing telephone calls. This file also contains codes that determine which call logic to use for each called party.

The call logic is created for the user based on interviews with them about the parties they want to call, the nature of the calls, the types of called parties, etc. Based on this interview and resulting information, the remote system 15 builds a profile for each different type of caller. Call logic files are built, and any other information that is needed to instruct the remote system 15 during a call, but which is not included in the user's data files. When completed, these call logic files contain the sequence of questions to be asked of the user, the content of questions, the expected answers they may give, the sequence of interactions to be made with the called party, etc., as well as the rules about how the called party's answers should be stored in the call results that the system 15 creates. Such call logic is used in various outgoing call generation systems.

The database relating to the parties to be called can reside in the user's legacy billing software (further explained below), or be uploaded manually by the user via an interface. In the case of manual database uploading, as shown in FIG. 1, the interface can be Web-based. This is especially convenient when the system or server 54 is located remotely from the user 5. In this case, any time the information in the database changes, the database is uploaded again to the remote system 15. Typical information from a sample upload file is shown in Appendix 2 attached hereto.

If the database 50 is maintained locally with the user, and set up for automatic integration (typically a more costly solution than manual upload), the system 15 extracts the A/R database from the provider's legacy database. This data extraction can be accomplished through a specialized automatic computer filter that can read the data format from most provider legacy systems and convert them into a standardized format for the system 15 to access over the Internet 40. In one embodiment, the filter is part of system 15, in other embodiments it might be located proximate to the database. The manual and automatic solutions can be combined for greater user control of the system.

System 15 of the present invention, which is located remotely from the user, interfaces with telephone network 22 through a private network Internet 20. Through Session Initiation Protocol (SIP), system 15 is able to set up a session with various called parties 24 through the private network Internet 20 (e.g., Level 3). As understood by a person of ordinary skill in the art, the SIP Protocol is a leading signaling protocol for Voice-over IP. Through the use of Voice Extensible Markup Language (VXML), a called party 24 is able to interact with system 15 over the private Internet 20 utilizing voice recognition technology. The utilization of SIP and VXML would be understood by a person of ordinary skill in the art as a suitable protocol and language for an interface to use in the invention for the purposes of call generation and handling.

In accordance with one aspect of the invention, the user 5 through use of a public Internet 40 is able to control system 15, which is located remote from the user. Through control of system 15, the user 5 is able to initiate various calls to parties 24, to monitor the calls, to review data regarding the telephone calls handled by system 15, and to control their processing, such as a particular call being directed to human operators 30. The user does not have to maintain an automated, outbound call system, such as at a call center 32, nor does the user 5 at a remote second location have to be proximate to system 15 at a first location or a call center at another location (third location). As such, a user, such as a company, may utilize automated call generation without a significant upfront investment in hardware and software at a call center 32. At the same time, a company can control the system to determine how the calls can be directed to their own operators at a user-owned call center 32. Therefore, the present invention gives the user 5 significant flexibility with respect to the automated generation of outgoing calls. The cost of utilizing system 15 remote from user 5 may be handled on a service-fee basis based upon the number of outgoing calls generated and handled. Thus, the present invention provides greater correlation between the cost of the system and the overall results of utilization of the system, such as greater debt collection, for example.

In addition to supporting manual database integration such as from database 50, the Web-based interface 40 to the system 15 provides controls for the user 5 to control or tailor the operation of the system 15. For example, in one embodiment, the user may input the number of operators available, and/or the desired maximum number of simultaneous outgoing calls. The fact that this data can be input to the system in real-time, based on up-to-date information about ongoing calls, is important to the remote control of the system 15 by a remote user 5. The user is able to handle a number of calls that might otherwise get lost, since the number of outgoing calls that need to be transferred to a human operator is not a guaranteed fixed percentage of the number of simultaneous outgoing calls, but varies randomly. Furthermore, there are regular, hard-to-predict fluctuations, based on many variables that are hard to measure, program or predict. The user remotely tailors the system 15. Furthermore, multiple users 5 may individually and simultaneously tailor the system 15 for their own specific needs and call centers.

Figure 2:
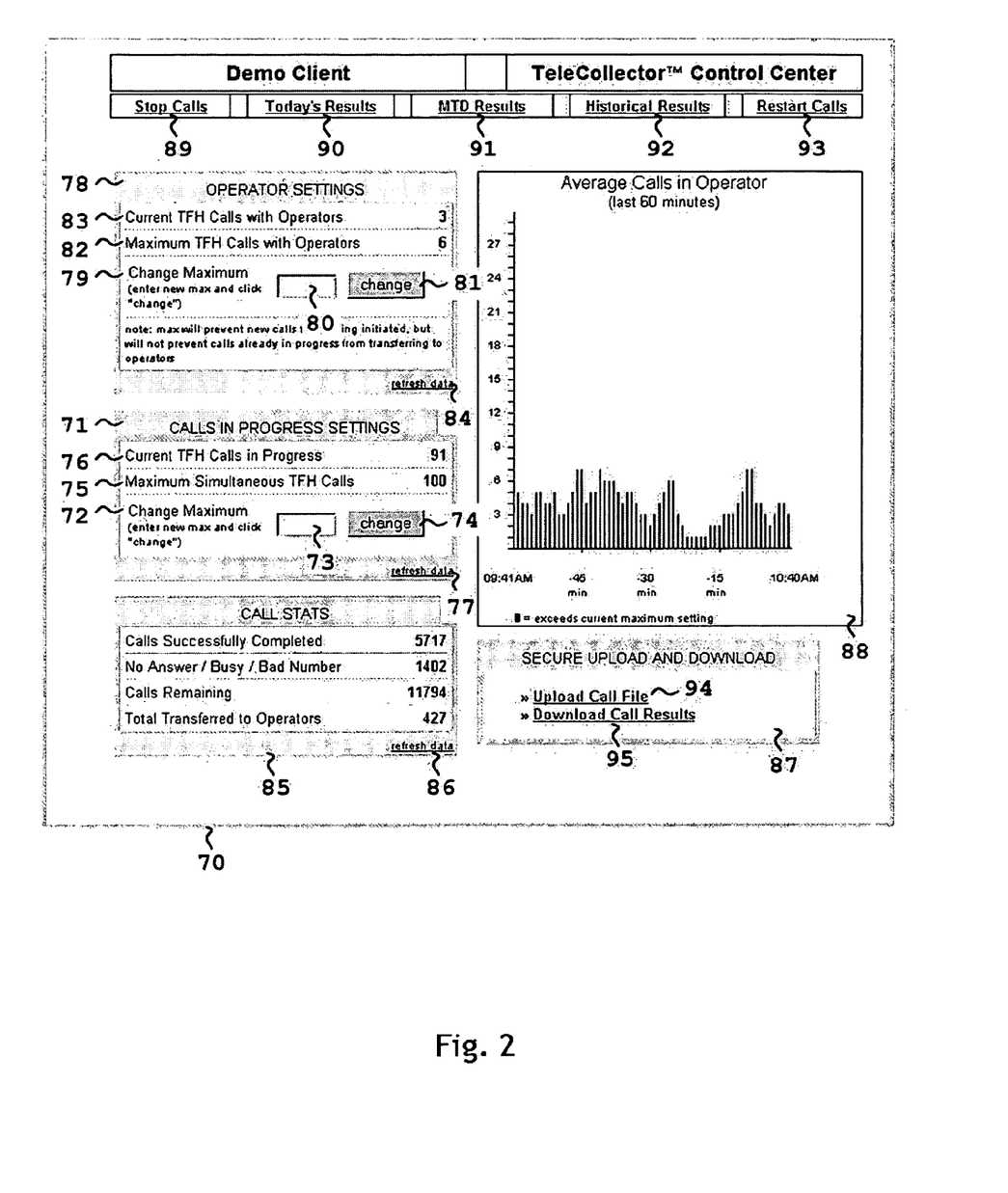
FIG. 2 is an illustration of an interface for utilization with the embodiment shown in FIG. 1.

Referring to FIG. 2, an interface 70 of system 15 is shown. The interface 70 may be presented in a Web-page or application running on a host computer (Web-based interface depicted in FIG. 2), and contains a section 71 containing interface controls 72, 73, 74 to control the maximum number of possible simultaneous outgoing telephone calls, as listed in the section 75. To control the maximum amount of outgoing calls, a user inputs an integer value in control box 73 that represents the maximum amount desired, and engages the "change" control button 74. By engaging the "refresh data" control button 77 the number displayed in row 75 reflects the new maximum amount. When control button 77 is engaged, row 76 is updated to represent the up-to-date number of telephone calls in progress. Automatic refresh of information in boxes 71, 78, 85 can also be achieved by setting the page to auto-refresh repeatedly at a specified interval.

A section 78 contains controls 79, 80, 81 to control the maximum number of possible simultaneous telephone calls with human operators 30. To control the maximum amount, a user 5 inputs an integer value in control box 80 that represents the maximum desired, and engages the "change" button 81. By engaging the "refresh data" button 84, or waiting for the information to refresh automatically, the number in row 82 will reflect the new maximum amount. When link 84 is pressed, or when the page refreshes automatically, row 83 is updated to represent the up-to-date number of telephone calls in progress between the called parties and human operators.

Section 85 displays telephone call statistics such as successfully completed calls, no answer/busy/bad number calls, remaining calls, and calls transferred to live operators or to call center inbound automated systems 33, for example. To reflect up-to-date statistics in this section, a user engages button 86, or waits for the page to auto-refresh.

A section 88 displays telephone call history, such as average calls in operator, with an easy-to-read indication (e.g., bar graph) of when the number of simultaneous telephone calls with human operators went over the desired amount.

A section 87 includes a control button 94 to allow users to upload a "call file", which contains all information necessary to initiate and conduct outgoing telephone calls, as discussed above (see Appendix 2). Such files would be previously created with a user's data. It also includes a control button 95 to allow users to download full telephone call history or call results to date.

A set of control buttons or links 89, 90, 91, 92, 93 provide various functionalities. Button 89 enables a user to instantaneously stop all calls. A variation of this button can allow the user to cancel all planned outgoing calls and all outgoing calls that are in the process of being made but have yet not been answered. Another variation of this button enables the stoppage of all new calls. Button 93 allows instantaneous startup of planned calls, after they have been cancelled. Button 91 allows the user to view "month-to-date" results: a quick summary that shows call statistics from the beginning of the current month until the very moment the button is pressed. Button 90 presents a summary of telephone call data from midnight of the previous day until the time at which the button is pressed. It will be understood by a person of ordinary skill in the art that such control in system 15 through the interface 70 may be appropriately handled in software.

Figure 3:
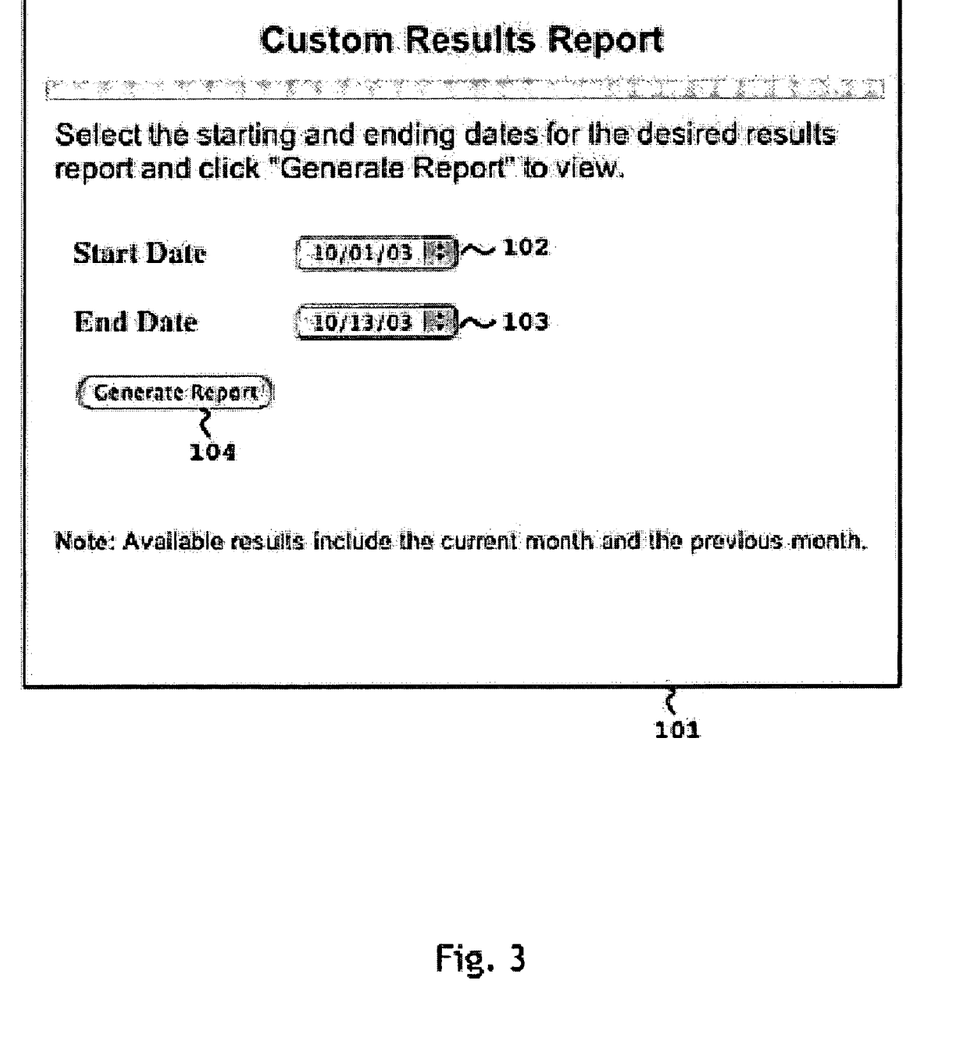
FIG. 3 is an illustration of the display associated with the interface of FIG. 2.

Button 92 allows the user to specify a range for which to view data. Referring to FIG. 3, another interface 101 allows the user to specify a start date 102, and end date 103, and a control button 104 that when pressed will generate a summary of the data between the dates selected.

The interface 70 also allows the user to download the results of calls made by the system, including a number of historical data about various features of each call, such as (a) telephone calls successfully completed, (b) telephone calls with busy signal, (c) telephone calls with no answer, (d) telephone calls with bad number, (e) telephone calls remaining to be made, (f) telephone calls transferred to human operators, (g) telephone calls resulting in transfers to inbound, automated systems, etc. Appendix 1 shows an example of such a file created by remote system 15.

The system 15 through use of VXML and SIP, and other technology captures the responses to each question on each call. It does this by capturing the DTMF input and phone hang-ups, and recording it in a database, either locally at the first location or remotely, such as at a second (user) location or third (call center) location, or both, locally and remotely. These responses include important called party information such as called party's insurance information, if applicable, credit card numbers and preferred contact information. In the case of health care providers, this information is important to their collection efforts and is the primary benefit of the call and, thus, a primary benefit offered by the invention.

Each call generated by remote system 15 asks for the debtor by name and, following confirmation of identity, requests payment of the specific amount that the debtor owes. This level of specificity is important to the call. Since the call is designed to get debtors to respond to the collector it is important for the debtors to feel that they will be held accountable for the amount owed. If the call is non-specific to the particular called party then it is not as effective in accomplishing that task. The invention provides remote access to A/R data, such as from database 50 accessed by remote system 15 over Internet 40. With the information remotely accessed, the system callers can ask the debtors for their specific balance owed, or can route small balances to a different processing system than large balances. The system 15 can also remotely access other available resources on the Internet 40, such as third party election payment processing systems.

The system 15 routes calls to live operators using branching call logic, as is known in the art. This logic can be based on the sequence of inputs that the user provided, on their area code, the amount that they owe, as well as other parameters such as whether they provide credit card information. This enables accounts that meet certain criteria to be processed by live operators 30, at the right point in the call. For example, in the event that the balance is very large a live operator may be the best way to process the account. The larger the account balance the less important the cost of the live operator becomes. Thus for certain large dollar accounts it may make sense to transfer them to a live operator when the called party answers the telephone call.

In accordance with another aspect of the invention, the remote automated call system 15 is able to forward information that it obtains to be location of the operators 30, such as call center 32. For example, credit card information, as well as other information, can be input into the telephone call system of the human operator before they pick up. For example, using DTMF, the relevant information, such as account ID, may be forwarded to the operator. The information may be transferred in the caller ID field of the second call that the system creates to forward to the third location, such as a call center 32 with live operators. Information can also be conveyed to the human operator 30 by playing a pre-recorded or automatically generated audio file after they pick up.

The human operators site or call center 32 is equipped with a local inbound automated system 33 (e.g., inbound IVR and ACD), which may be coupled to the operators' terminals 34 or other phone equipment they use. When the human operators' local call center receives a call from the call generation system 15, the call generation system 15 can provide it with data or information regarding the called party 24 and data regarding the system itself, via networks 20, 22, using for example DTMF and the caller ID field, and via data network links 36, 44 and Internet 40. Therefore, the additional information may be stored or located remotely from call center 32. When the human operator 30 picks up the call, the screen of their computer 34 and their caller ID mechanism of call center mechanism 33 can present this called party or system information, so they know what caller is on the other line, what they owe, how long they have been on the phone with the call generation system 15, what needs to be done next, etc., as well as the fact that the call was originally made remotely by the call generation system 15.

The system 15 retains control of the call for its duration at a location remote from the call center. That is, the system 15 can route the call to a different phone number at any time without dropping the called party. It does this by making a second call, on a separate telephone line, to the human operator 30, providing any necessary information about the caller 5 or the called party 24 to the human operator's telephone system, as further detailed below. The system 15 bridges the call and keeps both lines open, allowing the called party 24 to talk to the human operator 30 while being able to monitor both sides of the call. The system may record the spoken dialogue, and do other simple and advanced processing of data related to the call, such as computing the duration of the call, computing the total duration of silence in the call, recognizing keywords spoken by either party, etc. The system 15 provides such data collection remote from the user and remote from the call center generally.

Figure 4:
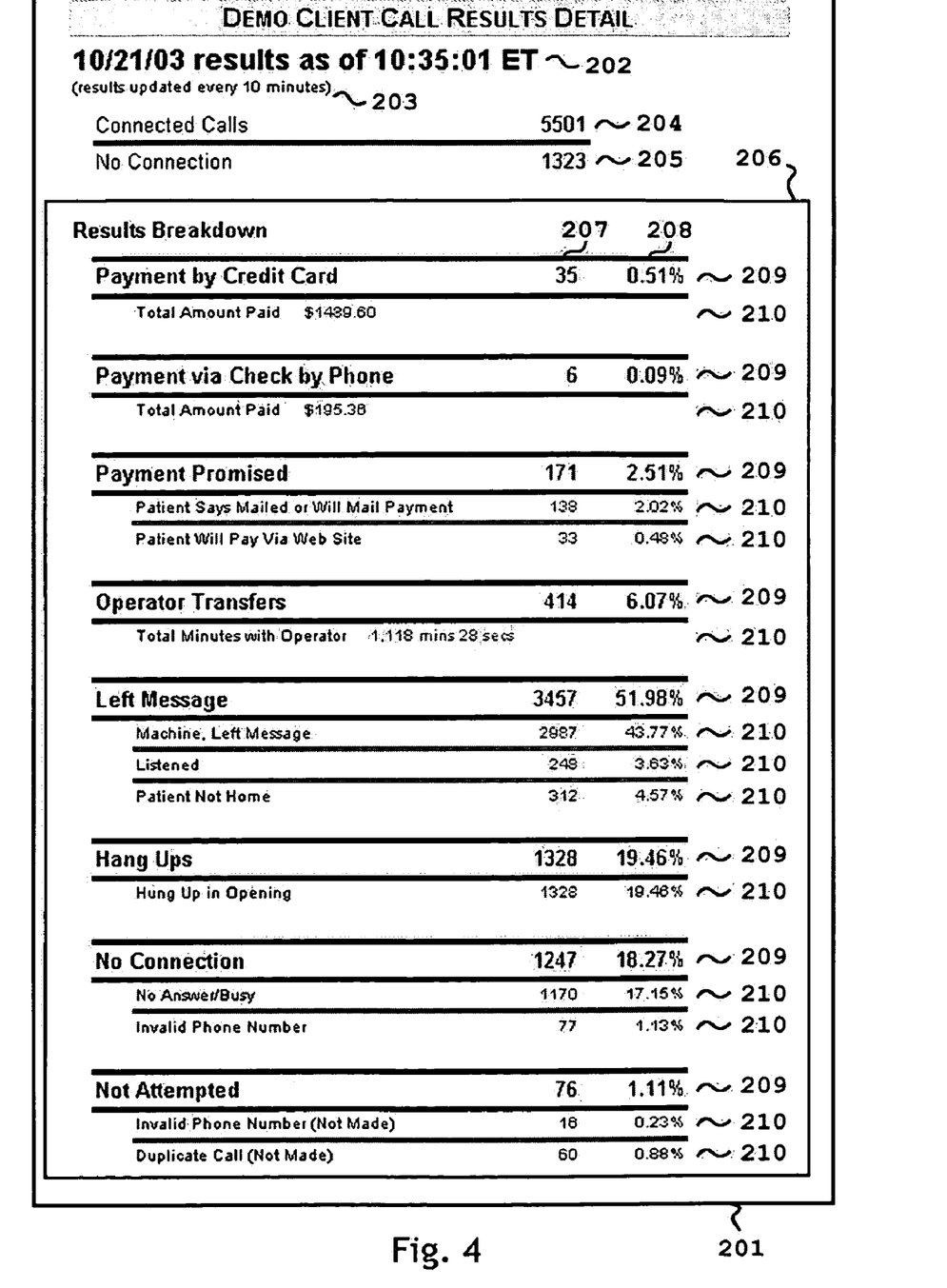
FIG. 4 is an illustration of another display associated with the system of FIG. 1.

Referring to FIG. 4, an interface 201, in the form of a Web page, and resulting from engaging button 104 shown in FIG. 3, provides telephone call results within the range selected by the user. The results contain a heading 202, how recent the data is 203, total number of connected calls (calls where the called party picked up), up to the minute for the period selected 204, and the total number of calls that were not connected 205. The page further contains a breakdown of the results 6, with two columns 207, 208, one column containing absolute numbers 207, the other percentages 208. Primary rows 209 list the main numbers for each item, and secondary rows list details 210.

When making the second call into the human operator's telephone call center, the call center can include an automated system, which may be part of the larger call center mechanism. The automation allows the system 15 to DTMF, to the call center 32, information regarding (a) the called party, and (b) the call generation system itself, such that the human operator 30 may see who originally started the call. This information can be available to the human operator on their computer screen 34 when they answer the call. Further, because credit card information, the ID of the called party, and other information can be input before the operator picks up, the operator (or the user for which the operator works) can already see the information needed about the call, for the purposes of finishing it.

The system 15 automatically repeats certain calls to ensure optimal response. The system 15 reviews the call results that are sub-optimal (e.g. no answer, busy) and thus identifies which parties or numbers are candidates to be called again. From the remote location, the user 5 can enter parameters manually into the system 15 specifying the time and frequency of the recalls, such as through an interface similar to that shown in FIG. 2. Such information might also be provided automatically by the system. The system 15 will automatically trigger the calls. This allows the system to be programmed to optimize the call results through persistent message delivery. For example, if the call is busy, then the system may repeat the call every 15 minutes for the next 2 hours. If a message is left on an answering machine then the system may recall the patient 48 hours after the first message and 24 hours after the second answering machine message. These call patterns can be tuned by the user to provide the optimal results.

The manually input data about the maximum outgoing telephone calls allowed, and the maximum simultaneous calls transferred to human operators, work to help the system automatically throttle the number of simultaneous outgoing calls. If the maximum number of simultaneous outgoing calls is reached the system stops making outgoing calls. When the actual number of ongoing calls falls below the maximum again, the system starts making outgoing calls again, until the maximum is reached again, and so on. When the maximum number of simultaneous calls with human operators is reached, the system stops making outgoing calls in the same manner, waiting until the number of calls with human operators falls below the maximum before starting to make outgoing calls again.

Alternative embodiments include allowing the user to select from various heuristics about what to do when the maximum is reached. In one variation the numbers are defaulted to different settings based on time of day, time of week, time of month, etc. In another variation the system's number for maximum simultaneous calls to operators is automatically set based on how many operators are logged into the call center. For example, the system 15 may interface with the call center 32 through Internet 40 and network link 36. Other automated and semi-automated mechanisms can be handled by the system. For example, the system could send an email to the system's user, or it could page the person in charge.

The system described is a complete solution for remote integration of an automatic call system 15, the user 5 having manual, semi-automatic and automatic real-time control of outgoing call generation and telephone call transfer to any third party (e.g., call center), with several mechanisms for achieving the transfer.

Figure 5:
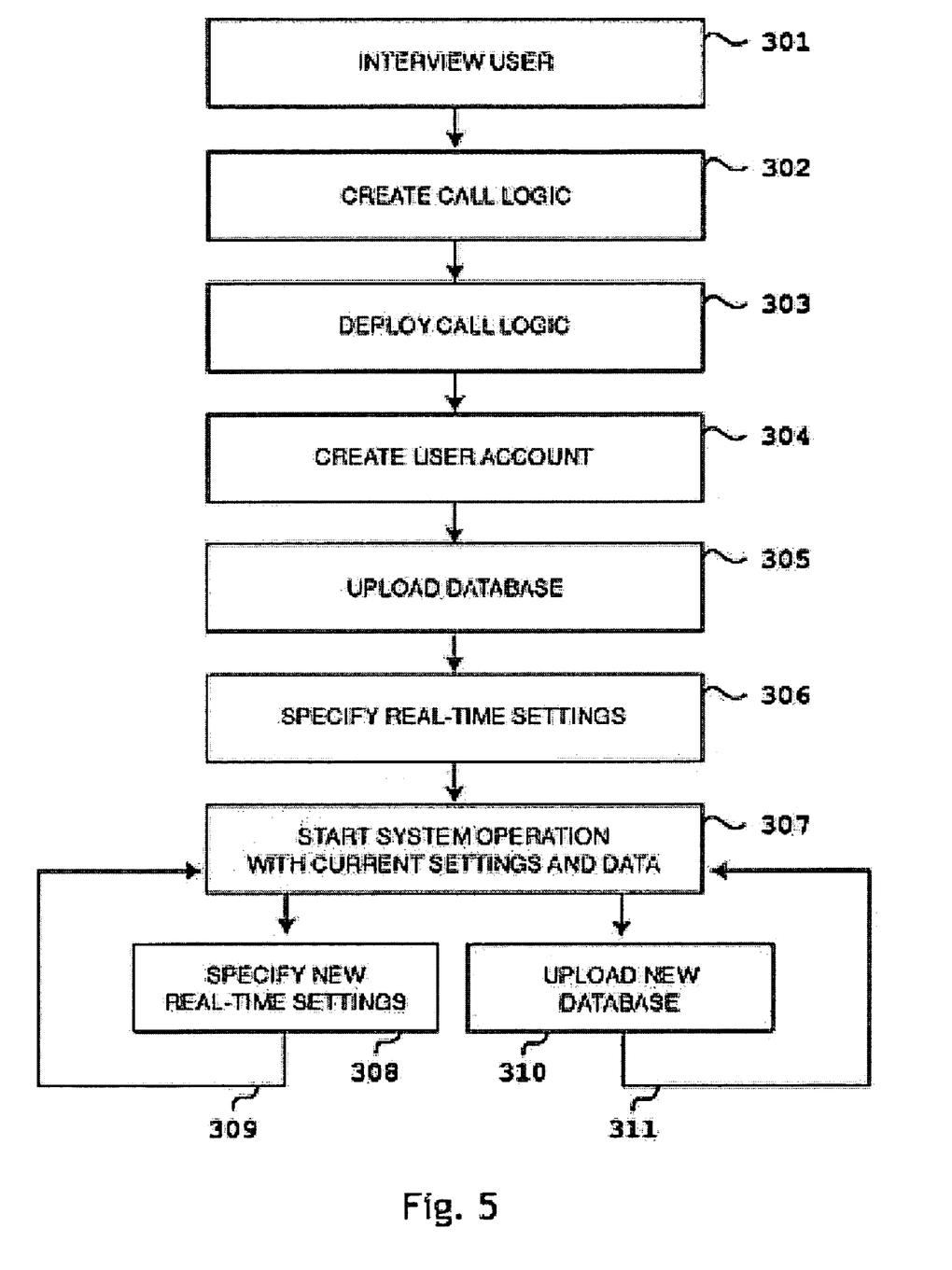
FIG. 5 is a flow chart of operation of one embodiment of the present invention.

Referring to FIG. 5, an example sequence of actions is described wherein the telephony automation system 15 is configured for a user and then used by that user as described here above. In step 301 the user's needs are assessed and a subsequent call sequence program assembled 302. In step 303 the call logic is deployed in the system 15. In step 304 a user account is created. In step 305 a database 50 with the necessary information is uploaded to the system, by the user or by the system's operator. In step 306 the system's real-time settings are set. In step 307 the user starts the system. In step 308 the user can choose to modify the real-time settings (the maximum number of simultaneous calls or the maximum number of simultaneous calls that can be transferred to human operators, for example) during the running of the system, and enter them (step 309) into the system 15, resulting in the system using these new settings during its continuous operation 307. In step 310 the user can choose to upload a new database, and have it load into the system while the system is running 311, resulting in the system reading in this new database and using it during its continuous operation 307.

While the present invention has been illustrated by a description of various embodiments and while these embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of applicant's general inventive concept.

Appendix 1

APPENDIX 1

SAMPLE RESULTS FILE

| PAT ID | TELEPHONE | RES | START DATE & TIME | END DATE & TIME | DUR |
|---|---|---|---|---|---|
| 265490569 | 352-748-6986 | 14 | 12/03/2003 06:57:22 AM | 12/03/2003 06:58:21 AM | 59 |
| 266068685 | 352-625-2110 | 17 | 12/03/2003 06:58:00 AM | 12/03/2003 06:58:39 AM | 39 |
| 266564568 | 304-748-5383 | 18 | 12/03/2003 06:58:16 AM | 12/03/2003 07:01:16 AM | 0 |
| 266707708 | 352-795-1707 | 15 | 12/03/2003 07:02:25 AM | 12/03/2003 07:03:32 AM | 67 |
| 266842296 | 352-795-5514 | 18 | 12/03/2003 07:03:13 AM | 12/03/2003 07:06:13 AM | 0 |
| 266842385 | 352-621-1157 | 18 | 12/03/2003 07:03:14 AM | 12/03/2003 07:06:14 AM | 0 |
| 267131356 | 352-564-3590 | 17 | 12/03/2003 07:05:31 AM | 12/03/2003 07:05:46 AM | 15 |
| 267316326 | 352-628-1415 | 18 | 12/03/2003 07:05:39 AM | 12/03/2003 07:05:40 AM | 0 |
| 267318468 | 352-352-4085 | 14 | 12/03/2003 07:06:04 AM | 12/03/2003 07:07:05 AM | 61 |
| 267532716 | 352-628-9426 | 18 | 12/03/2003 07:05:51 AM | 12/03/2003 07:08:51 AM | 0 |
| 268113098 | 352-563-2405 | 14 | 12/03/2003 07:19:06 AM | 12/03/2003 07:20:05 AM | 59 |
| 268113524 | 352-563-7419 | 14 | 12/03/2003 07:19:02 AM | 12/03/2003 07:20:03 AM | 61 |
| 268113604 | 352-628-2914 | 18 | 12/03/2003 07:18:45 AM | 12/03/2003 07:21:45 AM | 0 |
| 268366742 | 352-628-7419 | 17 | 12/03/2003 07:20:06 AM | 12/03/2003 07:20:40 AM | 34 |
| 268366760 | 352-686-1236 | 18 | 12/03/2003 07:19:44 AM | 12/03/2003 07:22:44 AM | 0 |
| 268366831 | 352-447-2408 | 18 | 12/03/2003 07:19:44 AM | 12/03/2003 07:22:45 AM | 0 |
| 268405175 | 352-666-4478 | 18 | 12/03/2003 07:19:47 AM | 12/03/2003 07:22:47 AM | 0 |

KEY
PAT ID   Patient identification number
RES   Result code (hangup, no answer, successful, etc.)
DUR   Duration of call in seconds Appendix 2

APPENDIX 2

SAMPLE UPLOAD FILE

| DBID | EXCLFACILT | NMLNAM | NMFNAM | EXHOMEPH# | AREACODE |
|---|---|---|---|---|---|
| 198485015 | WBO | PRANCER | JOHNATHAN | 9547252985 | 954 |
| 203129854 | GSM | BECKER | CATHLEEN | 5617443770 | 561 |
| 205869103 | 800 | PETERSON | GEORGE | 6784806136 | 678 |
| 208167945 | 333 | BRADSON | LISA | 5616942848 | 561 |
| 209376156 | FVR | KOSHA | ERICA | 9497609602 | 949 |
| 215949473 | SLU | MILLER | DENIESE | 6186671328 | 618 |
| 231924157 | DFC | RAYMAN | IRENE | 7706078974 | 770 |
| 232422483 | 340 | JEFFERSON | CLAUDIA | 7045531165 | 704 |
| 234783437 | 333 | SPIANI | EVELYN | 5618444815 | 561 |
| 235336882 | DFH | CLARK | ELIZABETH | 3104120202 | 310 |
| 237948085 | PCR | LEWIS | CHRISTOPH | 5616370111 | 561 |
| 238128717 | 378 | MYRON | SIDNEY | 2057869579 | 205 |
| 238710695 | ALV | BERAT | KATHY | 6194457939 | 619 |

| DBID | DEGSSN | SSNDIGITS | DOBDIGITS | LANGCODE | CLGROUP | DISCAMT | DISCPCT |
|---|---|---|---|---|---|---|---|
| 198485015 | Y | 9672 | 0723 | | BA | | |
| 203129854 | Y | 4553 | 0116 | | BA | | |
| 205869103 | Y | 5491 | 1027 | | BA | | |
| 208167945 | Y | 3391 | 0814 | | BA | | |
| 209376156 | Y | 2932 | 1220 | | MP | | |
| 215949473 | Y | 6311 | 0121 | | SP | 215 | 50 |
| 231924157 | N | 0001 | 1221 | | BA | | |
| 232422483 | Y | 3185 | 0516 | | BA | | |
| 234783437 | Y | 8510 | 0921 | | BA | | |
| 235336882 | Y | 4651 | 1105 | | SP | | |
| 237948085 | Y | 4986 | 0209 | | BA | | |
| 238128717 | Y | 5398 | 0506 | | SP | | |
| 238710695 | Y | 9403 | 1127 | | BA | | |

| DBID | NMLNAM01 | NMFNAM01 | PLANAMT | PLANMOS | DBPBAL |
|---|---|---|---|---|---|
| 198485015 | PRANCER | JOHNATHAN | | | 25 |
| 203129854 | BECKER | CATHLEEN | | | 62.25 |
| 205869103 | BRADSON | LISA | | | 80.95 |
| 208167945 | BRADFORD | KATHY | | | 10 |
| 209376156 | KOSHA | ERICA | | | 812 |
| 215949473 | MILLER | DENIESE | | | 429.7 |
| 231924157 | RAYMAN | IRENE | | | 393.06 |
| 232422483 | JEFFERSON | CLAUDIA | | | 155.07 |
| 234783437 | SPIANI | EVELYN | | | 3644.2 |
| 235336882 | CLARK | ELIZABETH | | | 627.15 |
| 237948085 | LEWEN | SIDNEY | | | 737.86 |
| 238128717 | LEWIS | CHRISTOPH | | | 317.32 |
| 238710695 | MYRON | SIDNEY | | | 476.62 |

KEY
DBID          Called party's Identification Number
EXCLFACILT    Identification Number for system user
NMLNAM        Called party's last name
NMFNAM        Called party's first name
EXHOMEPH#     Called party's home phone number
AREACODE      Called party's phone number area code
DEGSSN        Does social security number exist for called party?
SSNDIGITS     Last four digits of called party's social security number
DOBDIGITS     Called party's data of birth
LANGCODE      Language selected by called party (English, Spanish, etc.)
CLGROUP       Script code
DISCAMT       Discount amount
DISCPCT       Discount percentage
NMLNAM01      Guardian last name, if called party is minority
NMFNAM01      Guardian first name, if called party is minority
PLANAMT       Payment plan, if any
PLANMOS       Payment amount per month, if payment plan is selected
DBPBAL        Amount owed by called party

What is claimed is:

1. A system for automatically generating and controlling a plurality of outgoing telephone calls, the system comprising:

an automated outbound call system positioned at a first physical location, the outbound call system directly connected to a backbone point of presence at the first physical location and operable for generating and controlling a plurality of outgoing telephone calls to called parties using an Internet protocol;

an interface for controlling the automated outbound call system located at the backbone point of presence, the interface being an Internet web based interface accessible and located at a second physical location that is physically remote from the first location, the interface configured to receive data regarding telephone calls handled by the automated outbound call system;

the automated outbound call system further operable for varying its operation at the first location based upon the data received by the interface at the second location.

2. The system of claim 1 wherein the interface is operable to receive data related to a maximum number of simultaneous outgoing telephone calls and the call system is operable to vary its operation to limit the number of outgoing telephone calls based on the maximum number.

3. The system of claim 1 wherein the automated outbound call system is operable for transferring calls to human operators and wherein the interface is operable to receive data related to the number of telephone calls that are transferred to human operators and the call system is operable to vary its operation to limit the number of transferred telephone calls.

4. The system of claim 1 further comprising a display application operable to display data related to telephone calls handled by the system that are at least one of the following: successfully completed, with a busy signal, with no answer with a bad number, remaining to be made with human operators, or with automated call systems.

5. The system of claim 1 further comprising a display application operable to display data related to telephone calls handled by the system that is related to at least one of past call history and future call parameters.

6. The system of claim 5 further comprising a database located at a third physical location, remote from the first and second locations, the database containing information for generating the outgoing calls including at least one of: a phone number for a party to be called, a name of a party to be called, data related to a transaction of a party to be called, dialog procedures of a person to be called.

7. The system of claim 6 wherein the dialog procedures include at least one of the following: a sequence of questions for a party to be called, content of questions for a party to be called, or a sequence of interactions to be made with a party to be called.

8. The system of claim 1 wherein the call system is operable for routing a call to one of an automated call system or human operator at a third location and forwarding information regarding a party or a routed call to the third location along with the routed call.

9. A method for automatically generating and controlling a plurality of outgoing telephone calls comprising:

positioning an automated outbound call system at a backbone point of presence located at a first physical location and directly connecting the outbound call system to the backbone point of presence;

generating and controlling a plurality of outgoing telephone calls to called parties with the outbound call system using an Internet protocol;

interfacing with the automated outbound call system located at the backbone point of presence through an Internet web based interface accessible and located at a second physical location that is physically remote from the first location, the interface configured to receive data regarding telephone calls handled by the automated outbound call system;

varying the operation of the automated outbound call system at the first location using the interface at the second location.

10. The method of claim 9 further comprising using the interface to provide data related to a maximum number of simultaneous outgoing telephone calls and varying the operation of the call system to limit the number of outgoing telephone calls based on the maximum number.

11. The method of claim 9 wherein the automated outbound call system is operable for transferring calls to human operators and further comprising using the interface to provide data related to the number of telephone calls that are transferred to human operators and varying the operation of the call system to limit the number of transferred telephone calls.

12. The method of claim 9 further comprising displaying data with a display application related to telephone calls handled by the system that are at least one of the following: successfully completed, with a busy signal, with no answer or with a bad number, remaining, with human operators, or with automated call systems.

13. The method of claim 9 further comprising displaying data with a display application related to telephone calls handled by the system that is related to at least one of past call history and future call parameters.

14. The method of claim 9 further comprising obtaining, from a database located at a third physical location remote from the first and second locations, information for generating the outgoing calls including at least one of: a phone number for a party to be called, a name of a party to be called, data related to a transaction of a party to be called, dialog procedures of a person to be called.

15. The method of claim 9 wherein the dialog procedures include at least one of the following: a sequence of questions for a party to be called, content of questions for a party to be called, or a sequence of interactions to be made with a party to be called.

16. The method of claim 9 further comprising, with the call system, routing a call to one of an automated call system or human operator at a third location and forwarding information regarding a party or a routed call to the third location along with the routed call.

* * * * *